United States Patent [19]

Green et al.

[11] Patent Number: 5,542,702
[45] Date of Patent: Aug. 6, 1996

[54] PRESSURIZED GAS INFLATOR FOR VEHICLE OCCUPANT PROTECTION SYSTEMS

[75] Inventors: David J. Green, Brigham City; S. Mark Bunker; Walter A. Moore, both of Ogden; L. John Pierotti, Huntsville; J. Kirk Storey, Farmington; Brent K. Olson, Clearfield, all of Utah

[73] Assignee: Morton International, Inc., Chicago, Ill.

[21] Appl. No.: 410,771

[22] Filed: Mar. 27, 1995

[51] Int. Cl.⁶ ................................................. B60R 21/26
[52] U.S. Cl. ............................ 280/737; 280/741; 222/3
[58] Field of Search ........................ 280/737, 741, 280/740, 736, 742; 222/5, 3

[56] References Cited

U.S. PATENT DOCUMENTS

| | | | |
|---|---|---|---|
| 3,197,234 | 6/1963 | Bertrand | 280/737 |
| 3,450,414 | 6/1969 | Kobori | 280/736 |
| 3,567,245 | 3/1971 | Ekstrom | 280/737 |
| 3,713,667 | 1/1973 | Blanchard | 280/735 |
| 3,731,948 | 5/1973 | Risko | 280/737 |
| 3,741,580 | 6/1973 | Vos | 280/735 |
| 3,743,318 | 7/1973 | Yamaguchi et al. | 280/737 |
| 3,744,816 | 7/1973 | Yamaguchi et al. | 280/737 |
| 3,746,214 | 7/1973 | Stephenson | 222/3 |
| 3,777,772 | 12/1973 | Arnold et al. | 137/68.1 |
| 3,834,729 | 9/1974 | Oka et al. | 280/737 |
| 3,854,491 | 12/1974 | Bryan et al. | 137/1 |
| 3,901,530 | 8/1975 | Radke | 280/737 |
| 3,930,666 | 1/1976 | Lynch et al. | 280/737 |
| 4,021,058 | 5/1977 | Suzuki et al. | 280/737 |
| 4,943,086 | 7/1990 | Cunningham | 280/741 |
| 5,000,479 | 3/1991 | Werner et al. | 280/741 |
| 5,022,674 | 6/1991 | Frantom et al. | 280/741 |
| 5,031,932 | 7/1991 | Frantom et al. | 280/741 |
| 5,033,772 | 7/1991 | Frantom et al. | 280/737 |
| 5,066,038 | 11/1991 | Frantom et al. | 200/737 |
| 5,076,607 | 12/1991 | Woods et al. | 280/737 |
| 5,199,740 | 4/1993 | Frantom et al. | 280/736 |
| 5,257,819 | 11/1993 | Frantom et al. | 280/737 |
| 5,263,740 | 11/1993 | Frey et al. | 280/737 |
| 5,273,312 | 12/1993 | Coultas et al. | 280/737 |
| 5,290,060 | 3/1994 | Smith | 280/737 |
| 5,301,979 | 4/1994 | Allard | 280.1/737 |
| 5,344,186 | 9/1994 | Bergerson et al. | 280/737 |
| 5,345,876 | 9/1994 | Rose et al. | 280/737 |

FOREIGN PATENT DOCUMENTS

| | | |
|---|---|---|
| 0559335A2 | 9/1993 | European Pat. Off. . |
| WO9408819 | 4/1994 | WIPO . |

*Primary Examiner*—Eric D. Culbreth
*Assistant Examiner*—Paul N. Dickson
*Attorney, Agent, or Firm*—George W. Rauchfuss, Jr.; Gerald K. White

[57] ABSTRACT

A pressurized gas inflator suited for side impact airbags comprises an elongated cylindrical bottle having a closed end and an open end defining an outlet opening. A diaphragm is sealed across the open end of the bottle to form a chamber containing pressurized gas. A cup-shaped diffuser also has an open end secured to the open end of the bottle with the periphery of the diaphragm therebetween. A squib is mounted in the diffuser for rupturing the diaphragm. An enhanced squib with 300–400 milligrams of ZPP is used in one disclosed inflator and an augmented directional initiator is used in another disclosed inflator. The enhanced squib and augmented directional initiator provide heating to offset adiabatic cooling of the gas. The diffuser defines outlet ports for delivering the inflation gas. The cylindrical bottle has a mounting flange on its closed end, and the mounting flange may be an end cap with a radially extending flange. The diameter of the bottle may be necked down at the open end defining the outlet opening. The squib may be mounted through the wall of the diffuser, with the squib terminals exposed for plug connection.

39 Claims, 3 Drawing Sheets

PRESSURIZED GAS INFLATOR FOR VEHICLE OCCUPANT PROTECTION SYSTEMS

FIELD OF THE INVENTION

The invention herein relates to a pressurized gas inflator particularly well-suited for side impact or other small airbags in vehicle occupant protection systems.

BACKGROUND OF INVENTION

Some of the earliest airbags for use in vehicle occupant protection systems were inflated by pressurized gas alone. These were large size airbags, such as for the passenger side airbag or the larger driver's side airbags, and a substantial volume of inflation gas was required. In turn, the pressure vessel containing the inflation gas was also quite large and difficult to fit in the space available for occupant restraint systems within a vehicle. In some instances, remote pressure vessels with long delivery passages were provided, which limited the response time required to inflate the airbag.

More recent development of inflators for airbags has centered on pyrotechnic inflators and hybrid inflators, both of which utilize heat expansion of gas to achieve a sufficient volume of gas for inflating an airbag from a relatively compact inflator. In the case of the pyrotechnic inflator, the heat expansion is a result of the burning of the pyrotechnic, and in the case of the hybrid inflator, the heat expansion is a combination of the pyrotechnic action and heating of stored pressurized gas.

Hybrid inflators utilize their pyrotechnic material to release the stored gas in one of two ways. First, the pyrotechnic material may be released into the pressurized gas chamber in order to heat and expand the gas therein, causing a burst disk to rupture as a result of increased pressure, or second, the pyrotechnic material may have a projectile associated therewith which is driven through a burst disk to release the pressurized gas, which is also heated and expanded by the pyrotechnic material in the pressurized gas chamber Both the pyrotechnic and hybrid inflators are more compact than a purely pressurized gas system, but also result in a greater delay time before the onset of inflation. These longer delay times are not necessarily a drawback when applied to passenger and large driver's side airbags, wherein the desired inflation time is in part a function of the passenger's distance from the airbag.

Side impact airbags are positioned for deployment between the side of a vehicle and the occupant. The distance between the side of the vehicle and the occupant is relatively short, on the order of less than one foot, as compared to the distance separating a driver from a steering wheel and the even greater distance separating a passenger from a vehicle dash. Further, the front of a vehicle extends forwardly a substantial distance from the occupants and is designed with crumple zones which, in the event of a crash, provide a delayed and diminished interaction between the occupants and the steering wheel or dash. The side of a vehicle projects beyond the occupant by only the thickness of the door, the windows or the side body panels, offering very little opportunity for crumple zone protection. Vehicle design encompasses side beams to protect the integrity of the passenger compartment, and this is helpful in preventing injuries from a collapse of the side of the vehicle into the occupant's space. These design parameters for side impact protection do, however, leave a need for cushioning the passenger against interaction with the vehicle side. Side impact airbags used for that purpose require fast response and a fully inflated condition, also known as a "hard" bag, in order to be effective. The inflation response time, cost, and complexity of the pyrotechnic and hybrid inflators have made them difficult to adapt to smaller airbags.

SUMMARY OF INVENTION

It is a principal object of the invention to provide an inflator suitable for side impact or other small airbags in a vehicle occupant protection system.

It is another object of the invention herein to provide an inflator which has a fast response time and produces a controlled volume of inflation gasses.

It is a further object of the invention herein to provide an inflator of the above character which is compact and reliable.

It is an additional object of the invention herein to provide an inflator which is constructed of a minimum number of parts for efficient manufacture at relatively low cost.

In accomplishing these and other objects of the invention herein, there is provided a pressurized gas inflator comprising a bottle having an outlet opening and a diaphragm sealingly secured across the outlet opening to form a chamber containing pressurized gas. A diffuser having an open end is secured to the bottle with the diffuser open end surrounding the outlet opening, with the diffuser also defining a plurality of outlet ports. An electro-explosive initiator is mounted within the diffuser and positioned for rupturing the diaphragm upon operation thereof, in order to release the pressurized gas for delivery through the diffuser outlet ports.

According to one aspect of the invention, the bottle is an elongated cylindrical bottle having a closed end and an open end defining the outlet opening, the diaphragm extends across the open end of the bottle, and the diffuser is cup-shaped with an open end secured to the open end of the bottle with the peripheral edge of the diaphragm sealed to the bottle therebetween. The bottle may include a reduced diameter open end and outlet opening.

According to other aspects of the invention, the electro-explosive initiator is mounted to the end wall of a cup-shaped diffuser with the explosive material of the initiator positioned adjacent the diaphragm. One electro-explosive initiator contains an enhanced charge to provide heating. Another electro-explosive initiator employs a pyrotechnic charge delivered through a nozzle, and also provides heating. The heating offsets adiabatic cooling of the inflation gasses due to the pressure drop upon rupture of the diaphragm.

According to additional aspects of the invention, the bottle is provided with a flange for mounting purposes. In an inflator having an elongated cylindrical bottle, the flange is at one end and the diffuser is at the other end. The mounting flange in some inflators according to the invention is provided as part of an end piece of the bottle and in other inflators is mounted to a closed end of the bottle.

The various features of novelty which characterize the invention are pointed out with particularity in the claims annexed to and forming part of this specification. For a fuller understanding of the invention, its operating advantages and specific objects attained by its use, reference is made to the accompanying drawings and descriptive matter in which the preferred embodiments are illustrated.

DRAWINGS

The same reference numerals refer to the same elements throughout the various figures.

DESCRIPTION OF PREFERRED EMBODIMENTS

Figure 1:
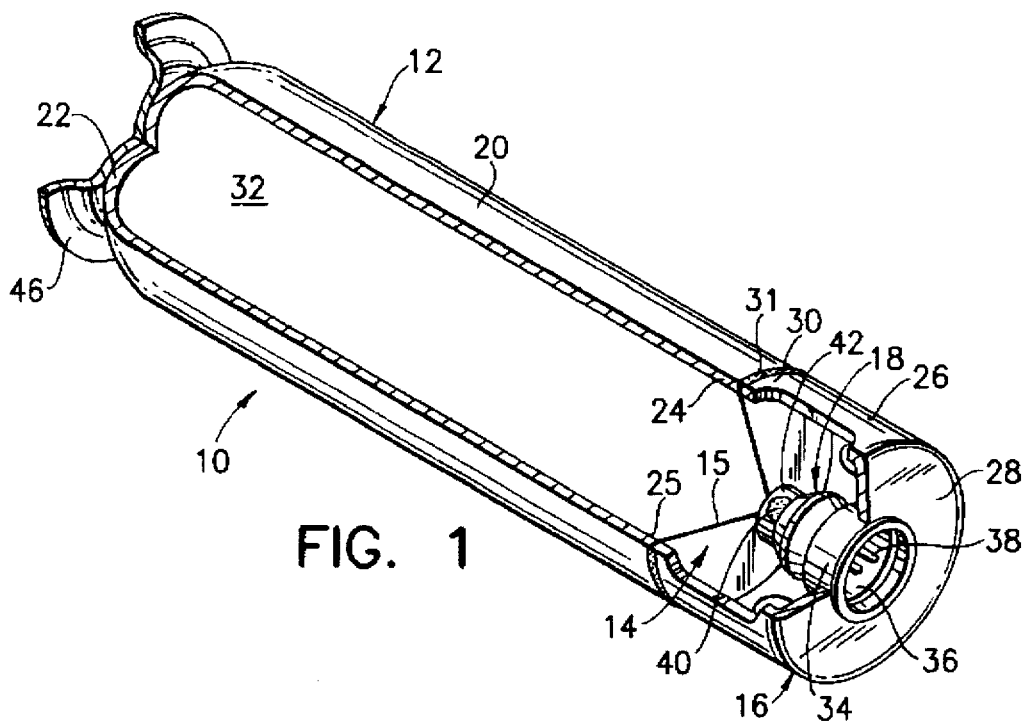
FIG. 1 is a perspective view, partially cut away, of a pressurized gas inflator according to the invention herein.
Figure 2:
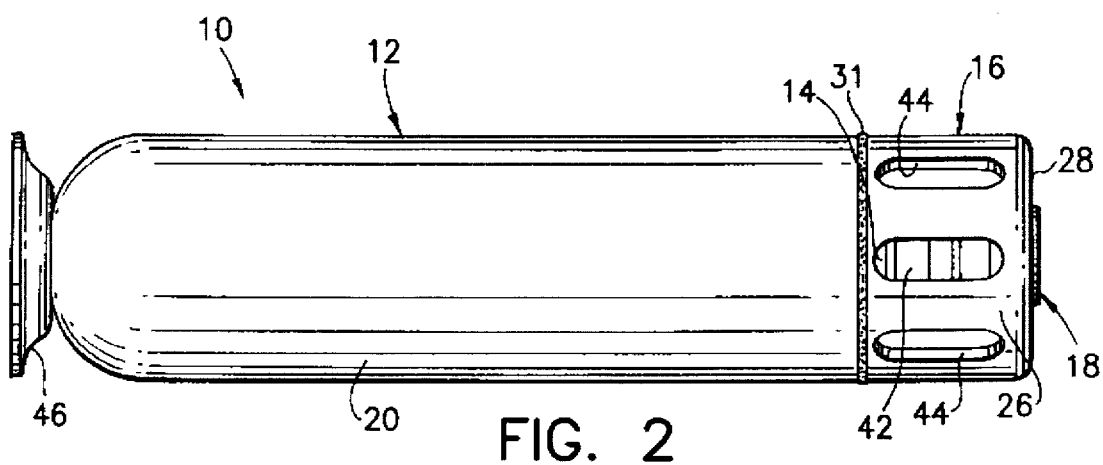
FIG. 2 is a side elevation view of the pressurized gas inflator of FIG. 1.
Figure 3:
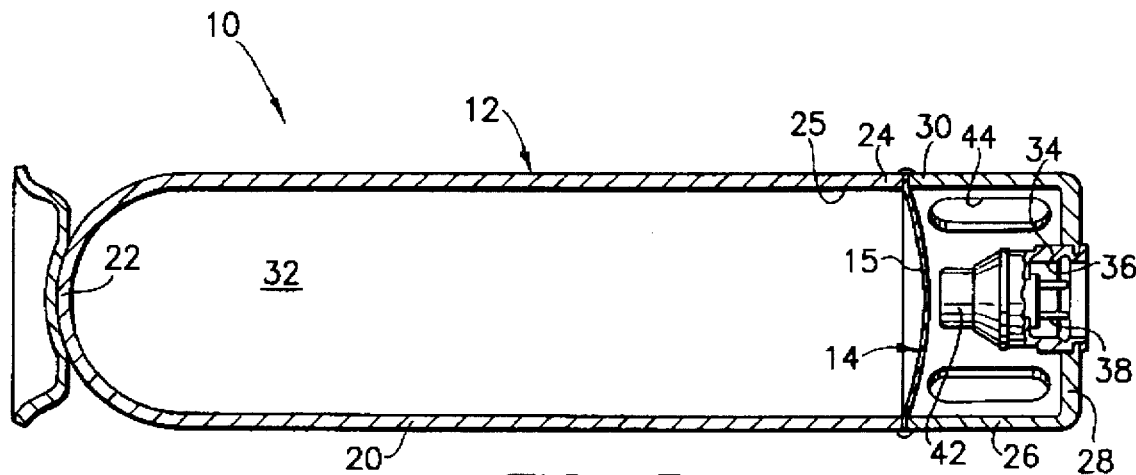
FIG. 3 is a longitudinal sectional view, partially cut away, of the pressurized gas inflator of FIG. 1.

An inflator 10 according to the invention herein is illustrated in FIGS. 1–3. The inflator 10 generally comprises a bottle 12, a diaphragm 14, a diffuser 16, and an electroexplosive initiator 18 positioned within the diffuser 16 for rupturing the diaphragm 14.

The bottle 12 is steel and has a cylindrical sidewall 20, a closed end wall 22, and an open end 24 defining an outlet opening 25. The closed end is formed integrally with the cylindrical sidewall 20, e.g., by deep drawing manufacturing technique. The diaphragm 14 is a circular metal disk made of Inconel and having its periphery positioned on the open end 24 of the bottle 12. The diffuser 16 is cup-shaped, having a cylindrical sidewall 26 and an end wall 28, and is also steel. The sidewall 26 extends to an open end 30. The cylindrical sidewall 20 of the bottle and the sidewall 26 of the diffuser have the same diameters wherein their open ends 24, 30 are contiguous. The open ends 24, 30 of the bottle and the diffuser are secured together by weld 31 with the peripheral edge of the diaphragm therebetween, with the diaphragm sealing the outlet opening 25 of the bottle 12.

The bottle 12 and the diaphragm 14 thereby define a chamber 32 in which a pressurized inert gas, such as Argon or Nitrogen, is stored at a predetermined pressure. The chamber holds approximately fourteen cubic inches (14 c.i.) of gas at approximately 4100 P.S.I. The pressure of the stored gas causes the diaphragm 14 to dome outwardly from chamber 32, with the distended central portion of the diaphragm indicated at 15 in FIGS. 1 and 3.

The electro-explosive initiator 18 is mounted to the diffuser 16. More particularly, the initiator 18 comprises a base 34 which is mounted through a central opening in the diffuser end wall 28. The base 34 defines a socket 36 for receiving a plug connector to the initiator terminals 38. The initiator 18 further comprises an explosive material 40 contained within a cover 42 which extends axially from the base 34 and is positioned adjacent the domed diaphragm 14 and, in the embodiment shown, adjacent the distended central portion 15 thereof. The electro-explosive initiator 18 is also referred to as a squib or ignitor, and is well-known in the art. The squib 18 contains approximately 100–225 milligrams of "ZPP," which is zirconium potassium perchlorate. Other powders are also suitable.

The diffuser 16 defines a plurality of ports 44 evenly spaced about the periphery of its sidewall 26, for exiting the inflation gasses. The flow area through the diffuser ports 44 may be smaller than the outlet opening 25 of the bottle if any choking of the delivery of gas from chamber 32 is desired. The inflator 10 also comprises a mounting flange 46 which is secured to the closed end 22 of the bottle 12. The flange is useful in mounting the inflator within the vehicle.

Upon sensing of a crash condition, an electrical signal is provided to the squib 18 through its terminals 38, and the electrical signal is utilized to ignite the explosive 40 within the cover 42. The resultant explosive force bursts open the cover 42 and ruptures the diaphragm 14, releasing the stored gas through the outlet opening 25 at the open end 24 of the bottle 12. The gas flows through the diffuser 16 and the diffuser ports 44 for delivery to the airbag. The airbag is typically mounted with the inflator such that the inflation gas exiting the diffuser ports is applied directly to the interior of the airbag. The inflator 10 exhibits a very short delay time to begin filling the airbag, on the order of 0.8 milliseconds, and delivers its inflation gasses in under 10 milliseconds.

Because the inflator 10 delivers stored gas without heating, the volume of the gas delivered is well controlled. This permits use of a side impact or other small airbag which has either a small vent or no vent at all, without danger of over-inflation and consequent bursting of the bag. This in turn permits the airbag to be filled to relatively high pressure, producing the "hard" airbag necessary to prevent occupants from contacting the vehicle door or window during a side impact crash event.

Figure 4:
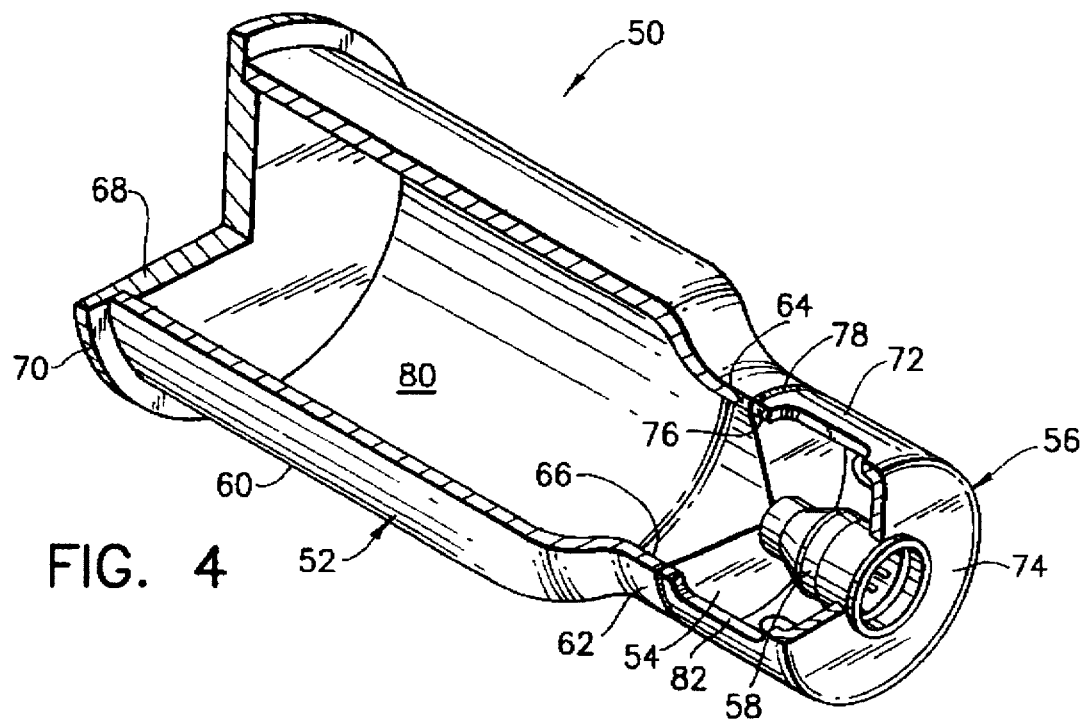
FIG. 4 is a perspective view, partially cut away, of another pressurized gas inflator according to the invention herein.

Another pressurized gas inflator 50 according to the invention herein is illustrated in FIG. 4. The inflator 50 generally comprises a bottle 52, a diaphragm 54, a diffuser 56 and an enhanced electro-explosive initiator 58 mounted in the diffuser 56 for rupturing the diaphragm 54.

The bottle 52 comprises a generally cylindrical sidewall 60 having a reduced-diameter neck portion 62 providing an open end 64 of the bottle, which also defines its outlet opening 66. The bottle 12 has a closed end provided by an end plate 68, which is welded to the cylindrical sidewall 60 of the bottle and including a radially extending flange 70 for mounting the inflator The diaphragm 54 is circular and has its peripheral edge received on the open end 64 of the bottle 12. The diffuser 56 is cup-shaped, having a cylindrical sidewall 72 and an end wall 74. The sidewall 72 of the diffuser terminates in an open end 76, which is received on the open end 64 of the bottle 52 with the peripheral edge of the diaphragm 54 therebetween. A weld 78 is used to sealingly secure the diaphragm to the open end of the bottle 52 and to also secure the diffuser on the bottle. The bottle 52, including its end wall 68, and the diaphragm 54 together form a chamber 80 in which a pressurized inert gas is stored. This domes the diaphragm 54 outwardly, toward the end wall 74 of the diffuser 56. A primary distinction between the inflator 50 and the inflator 10 described above is providing of storage chamber 80 with a larger diameter than the outlet opening 66, to reduce the area of the diaphragm relative to a cross-section of chamber 60 and thereby also to keep the total force exerted on the diaphragm at a lower, desired level.

The diffuser 56 mounts the enhanced electro-explosive initiator 58 in the end wall 74 thereof as described above with respect to the diffuser 16 and initiator 18. The enhanced electro-explosive initiator 58, also known as a "super squib" uses the same base 34 as initiator 18, but has an enlarged cover 82 containing an enhanced amount of explosive material 40. Whereas the standard squib 18 contains approximately 200 milligrams of ZPP, the super squib 58 contains approximately 300–400 milligrams of ZPP. An "enhanced" squib has at least twice the explosive of a standard squib.

The diffuser defines a plurality of ports 84 in the sidewall thereof, for delivering the inflation gas upon rupture of the diaphragm 54. The inflator 50 operates in a similar manner as the inflator 10 described above, with the super squib 58 explosively rupturing the diaphragm 54 to permit flow of delivery gas from the chamber 80 through the diffuser ports 84.

The enhanced explosive insures that the diaphragm will be ruptured and also provides heat input to offset, at least partially, the adiabatic cooling of the gas as its pressure drops rapidly. Even though the super squib 58 burns in, nominally, 1 millisecond, it heats the steel diffuser and the bottle near the exit opening and these in turn heat the outflowing gas. The heating is relatively uniform among inflators 50, wherein there is no loss of control over inflation of the airbag. Thus, the inflator 50 also exhibits the advantages of a very short delay in the onset of delivery gas to the airbag, and in providing a controlled quantity of gas to the airbag, permitting "hard" airbag inflation which is desirable for the side impact application.

Figure 5:
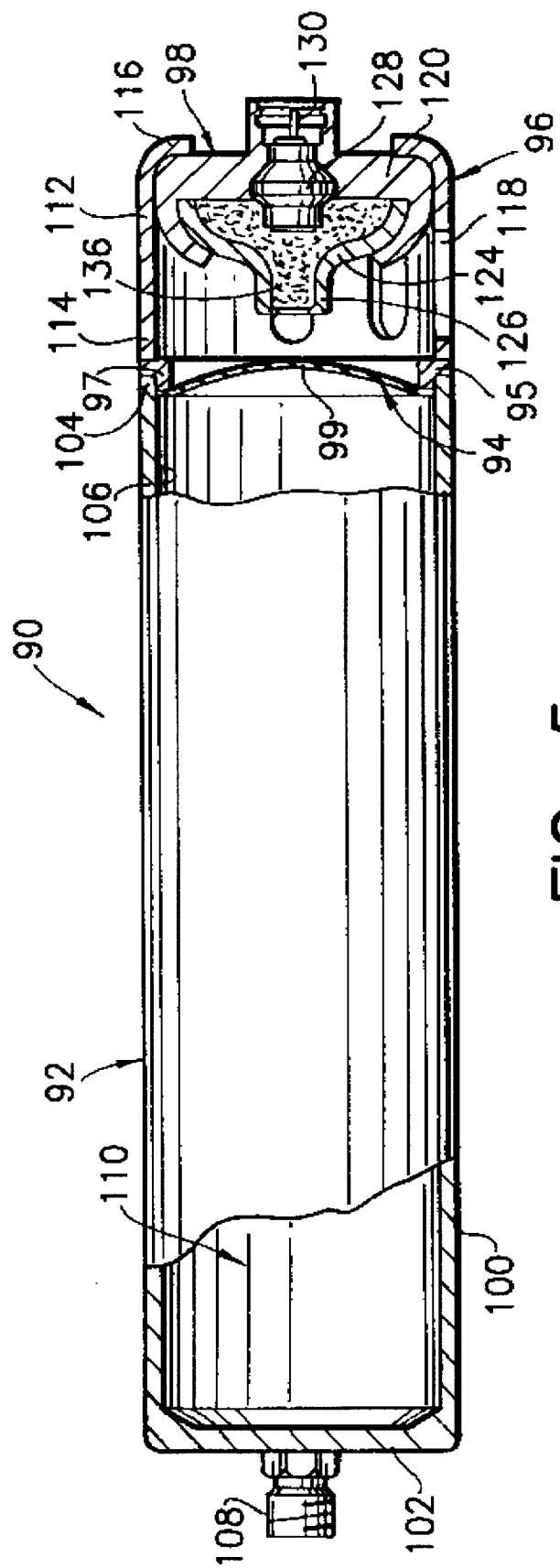
FIG. 5 is a side elevation view, partially in section, of another pressurized gas inflator according to the invention herein.

With reference to FIG. 5, another pressurized gas inflator 90 according to the invention is illustrated. It also generally comprises a bottle 92, a diaphragm 94, and a diffuser 96 mounting an augmented directional electro-explosive initiator 98.

The bottle 90 has a cylindrical sidewall 100, end wall 102 with mounting stud 108, and open end 104 defining an outlet opening 106 sealed off by diaphragm 94 to form a chamber 110 containing pressurized gas. The diffuser 96 has a cylindrical sidewall 112 having an end 114, with the diaphragm secured to the bottle between the bottle end 104 and diffuser end 114. Exit ports 118 are defined in the diffuser sidewall but are not evenly spaced, providing a directional gas delivery which is useful in some applications.

Diaphragm 94 includes a peripheral mounting ring 95 having a leg 97 which fits inside the cylindrical sidewall. A thin, rupturable membrane 99 is welded to the leg 97, and the mounting ring 95 forming the peripheral edge of diaphragm 94 is received and welded between end 104 of the bottle 90 and end 114 of the diffuser 96. This provides a thicker edge of the diaphragm for welding purposes.

The augmented directional initiator 98 is positioned at the other end of the diffuser 96 and functions both to provide the end wall of the diffuser as well as rupture the diaphragm 94 and provide heating of the gas. The initiator 98 comprises a base 120 having an integral skirt 122 extending from the periphery. Prior to assembling the initiator 98, the skirt 122 is tubular. A cap 124 of generally hemispherical configuration is received against the periphery of base 120 adjacent and inside the skirt 122, and the skirt 122 is roll crimped onto the cap in order to assemble the base and cap together, as they are shown in the drawings. The cap 124 further defines a nozzle 126 extending from the interior of the initiator 98. End 116 of the diffuser is roll crimped onto the base 120, to mount the initiator to the diffuser.

The base 120 of the initiator 98 forms the end of diffuser 96 and defines an opening receiving and mounting a squib 128 and terminals 130. The squib contains a small explosive charge, on the order of 100 milligrams of ZPP. The nozzle 126 is directed at the diaphragm 94, and has an integral scored end wall 132. The interior of the cup is filled with a pyrotechnic 136, which augments the action of the squib 128. The pyrotechnic is preferably $BKNO_3$ for production of heat without copious production of gas. Approximately 5 grams of the pyrotechnic are used in inflator 90.

Upon a crash event, the squib 198 ignites the pyrotechnic 136 which bursts the end wall 132 of nozzle 126. The nozzle directs the pyrotechnic force and heat to rupture diaphragm 94 and also heats the gas in the chamber 110 as it flows through the diffuser 96. The initiator 98 burns for approximately 2 milliseconds, but its heating effect is longer due to heating of inflator parts. The heating compensates for adiabatic cooling of the gas due to pressure drop, but the volume of inflation gas remains predictable for providing a "hard" bag.

The inflators 10, 50 and 90 each comprise only five parts, which are individually easy to fabricate and collectively easy to assemble. This simplicity contributes both to the low cost of the inflators, and to their reliability in operation.

Accordingly, preferred embodiments of cold gas inflators have been described which admirably achieve the objects of the invention herein. With reference to the description of the preferred embodiments, those skilled in the art will appreciate that modifications made be made without departing from the spirit of the invention. Therefore, it is not intended that the scope of the invention be limited to the specific embodiments illustrated and described. Rather, it is intended that the scope of the invention be determined by the appended claims and equivalents thereof.

What is claimed is:

1. A pressurized gas inflator comprising:
   A) a bottle having an outlet opening;
   B) a diaphragm sealingly secured across the outlet to form a chamber containing only pressurized gas;
   C) a cup-shaped diffuser having a sidewall with an open end, and an end wall opposite the open end, the open end of the diffuser secured to the bottle surrounding the outlet opening, the sidewall of the diffuser defining a plurality of outlet ports, and the diffuser providing a flow path from the outlet opening covered by the diaphragm to the outlet ports; and
   D) an electro-explosive initiator mounted to the end wall of the diffuser and including an explosive material contained within the electro-explosive initiator, the explosive material positioned within the diffuser spaced apart from the diaphragm and not blocking the flow path from the outlet opening to the diffuser ports, for rupturing the diaphragm upon operation thereof to release the pressurized gas for delivery through the diffuser outlet ports.

2. A pressurized gas inflator as defined in claim 1 wherein the diaphragm and the open end of the diffuser are secured to the bottle together.

3. A pressurized gas inflator as defined in claim 2 wherein the diaphragm covering the outlet opening includes a peripheral mounting ring welded to the bottle.

4. A pressurized gas inflator as defined in claim 2 wherein the open end of the diffuser is contiguous with the outlet opening of the bottle.

5. A pressurized gas inflator as defined in claim 4 wherein the bottle has a cylindrical sidewall with a closed end and an open end defining the outlet opening.

6. A pressurized gas inflator as defined in claim 5 and further comprising a mounting flange extending from the closed end of the bottle.

7. A pressurized gas inflator as defined in claim 6 wherein the closed end of the bottle is an end plate sealingly secured to the cylindrical sidewall of the bottle, and the mounting flange is an integral extension of the end plate.

8. A pressurized gas inflator as defined in claim 5 wherein the cylindrical sidewall of the bottle has a reduced diameter adjacent the outlet opening.

9. A pressurized gas inflator as defined in claim 5 wherein the open end of the diffuser sidewall is contiguous with the open end of the cylindrical bottle sidewall, the peripheral edge of the diaphragm is received between the diffuser and the bottle, and the diffuser, bottle and diaphragm are secured together by welding along the peripheral edge of the diaphragm.

10. A pressurized gas inflator as defined in claim 9 wherein the electro-explosive initiator is an enhanced squib.

11. A pressurized gas inflator as defined in claim 10 wherein the enhanced squib includes between approximately 300 and 400 milligrams of explosive material.

12. A pressurized gas inflator as defined in claim 11 wherein the explosive material is zirconium potassium perchlorate.

13. A pressurized gas inflator as defined in claim 9 wherein the electro-explosive initiator is an augmented directional initiator including a squib, pyrotechnic material augmenting the squib, and a nozzle spaced apart from and directing the explosive force and heat of the squib and the augmenting pyrotechnic material toward the diaphragm and gas chamber.

14. A pressurized gas inflator as defined in claim 13 wherein the augmenting pyrotechnic is $BKNO_3$.

15. A pressurized gas inflator as defined in claim 13 wherein the augmented directional initiator includes between approximately 3 and 8 grams of augmenting pyrotechnic material.

16. A pressurized gas inflator as defined in claim 9 wherein the electro-explosive initiator has a base defining a socket with terminals therein, and the base is mounted through the end wall of the diffuser with the socket exposed for receiving a plug connector to the terminals for operating the electro-explosive initiator, and the electro-explosive initiator has an explosive material positioned within the diffuser adjacent the diaphragm.

17. A pressurized gas inflator as defined in claim 16 wherein the diaphragm is domed from the pressure of the gas within the chamber, and the explosive material of the electro-explosive initiator is positioned centrally with respect to the domed diaphragm.

18. A pressurized gas inflator as defined in claim 17 wherein the outlet ports defined by the diffuser are sized to provide a desired flow rate of gas from the inflator.

19. A pressurized gas inflator as defined in claim 17 and further comprising a mounting flange extending from the closed end of the bottle.

20. A pressurized gas inflator as defined in claim 19 wherein the closed end of the bottle is an end plate sealingly secured to the cylindrical sidewall of the bottle, and the mounting flange is an integral extension of the end plate.

21. A pressurized gas inflator as defined in claim 1 wherein the bottle has a cylindrical sidewall with a closed end, and a mounting flange secured to and extending from the closed end of the bottle.

22. A pressurized gas inflator as defined in claim 21 wherein the closed end of the bottle is an end plate sealingly secured to the cylindrical sidewall of the bottle, and the mounting flange is an integral extension of the end plate.

23. A pressurized gas inflator as defined in claim 1 wherein the electro-explosive initiator has a base defining a socket with terminals therein, and the base is mounted through the diffuser with the socket exposed for receiving a plug connector to the terminals for operating the electro-explosive initiator, and the electro-explosive initiator has an explosive material positioned within a cover within the diffuser adjacent but spaced apart from the diaphragm.

24. A pressurized gas inflator as defined in claim 1 wherein the electro-explosive initiator is an enhanced squib.

25. A pressurized gas inflator as defined in claim 24 wherein the enhanced squib includes between approximately 300 and 400 milligrams of explosive material.

26. A pressurized gas inflator as defined in claim 25 wherein the explosive material is zirconium potassium perchlorate.

27. A pressurized gas inflator as defined in claim 1 wherein the electro-explosive initiator is an augmented directional initiator including a squib, pyrotechnic material augmenting the squib, and a nozzle spaced apart from and directing the explosive force and heat of the squib and the augmenting pyrotechnic material toward the diaphragm and gas chamber.

28. A pressurized gas inflator as defined in claim 27 wherein the augmenting pyrotechnic is $BKNO_3$.

29. A pressurized gas inflator as defined in claim 27 wherein the augmented directional initiator includes between approximately 3 and 8 grams of augmenting pyrotechnic material.

30. A pressurized gas inflator as defined in claim 1 wherein the outlet ports defined by the diffuser are sized to provide a desired flow rate of gas from the inflator.

31. A pressurized gas inflator comprising:
   A) an elongated cylindrical bottle having a closed end and an open end defining an outlet opening from the bottle;
   B) a diaphragm extending across the open end of the bottle and having its peripheral edge sealingly secured to the open end of the bottle to seal the outlet opening and thereby form a chamber containing only pressurized gas;
   C) a cup-shaped diffuser having a sidewall with an open end and an end wall opposite the open end, the sidewall having substantially the same diameter as the cylindrical bottle and the open end thereof juxtaposed the outlet opening of the bottle, the open end of the diffuser secured to the open end of the bottle with the open end of the diffuser mating with the outlet opening of the bottle, the sidewall of the diffuser defining a plurality of outlet ports, and the diffuser providing a flow path from the outlet opening covered by the diaphragm to the outlet ports; and
   D) an electro-explosive initiator mounted to the end wall of the diffuser and including an explosive material contained within the electro-explosive initiator, the explosive material positioned within the diffuser spaced apart from the diaphragm and not blocking the flow path from the outlet opening to the diffuser ports, for rupturing the diaphragm upon operation of the initiator;
   wherein the explosive action of the initiator ruptures the diaphragm to non-mechanically release the pressurized gas for delivery through the diffuser ports.

32. A pressurized gas inflator as defined in claim 31 wherein the diaphragm includes a peripheral mounting ring received between the bottle and diffuser, and the mounting ring, bottle and diffuser are welded together.

33. A pressurized gas inflator as defined in claim 31 wherein the electro-explosive initiator is an enhanced squib.

34. A pressurized gas inflator as defined in claim 33 wherein the enhanced squib includes between approximately 300 and 400 milligrams of explosive material.

35. A pressurized gas inflator as defined in claim 34 wherein the explosive material is zirconium potassium perchlorate.

36. A pressurized gas inflator as defined in claim 31 wherein the electro-explosive initiator is an augmented directional initiator including a squib, pyrotechnic material augmenting the squib, and a spaced from the diaphragm and directing the explosive force and heat of the squib and the augmenting pyrotechnic material toward the diaphragm and gas chamber.

37. A pressurized gas inflator as defined in claim 36 wherein the augmenting pyrotechnic is $BKNO_3$.

38. A pressurized gas inflator as defined in claim 36 wherein the augmented directional initiator includes between approximately 3 and 8 grams of augmenting pyrotechnic material.

39. A pressurized gas inflator as defined in claim 31 wherein the electro-explosive initiator has a base defining a socket with terminals therein, and the base is mounted through the end wall of the diffuser with the socket exposed for receiving a plug connector to the terminals for operating the electro-explosive initiator, and the electro-explosive initiator has an explosive material positioned within the diffuser adjacent but spaced-apart from the diaphragm.

* * * * *